United States Patent [19]

Musschoot

[11] 3,750,866

[45] Aug. 7, 1973

[54] VIBRATORY CONVEYOR WITH COUNTERPOISE

[75] Inventor: Albert Musschoot, Barrington, Ill.

[73] Assignee: General Kinematics Corporation, Barrington, Ill.

[22] Filed: June 15, 1971

[21] Appl. No.: 153,375

[52] U.S. Cl. .......................................... 198/220 CB
[51] Int. Cl. ............................................ B65g 27/30
[58] Field of Search ............... 198/220 CB, 220 DA; 209/315, 344, 365 R, 365 A, 365 B

[56] References Cited
UNITED STATES PATENTS

| | | | |
|---|---|---|---|
| 672,420 | 4/1901 | Grand | 209/344 |
| 3,134,483 | 5/1964 | Musschoot | 198/220 DA |
| 3,467,241 | 9/1969 | Oser | 198/220 CB |
| 3,528,541 | 9/1970 | Barton | 198/220 CB |

FOREIGN PATENTS OR APPLICATIONS

| | | | |
|---|---|---|---|
| 240,656 | 4/1960 | Australia | 198/220 CB |
| 806,441 | 12/1958 | Great Britain | 198/220 CB |

*Primary Examiner*—Edward A. Sroka
*Attorney*—Axel A. Hofgren, Wm. A. Van Santen et al.

[57] ABSTRACT

A blanaced vibratory conveyor system including a base resiliently mounting a trough-like conveying structure. A driving mechanism for reciprocating the conveyor is provided and in addition, counterpoise elements are mounted on the base for reciprocation relative thereto and are driven by the drive mechanism 180° out of phase with the reciprocation of the conveyor so as to balance out the vibratory forces generated through reciprocation of the conveyor.

5 Claims, 6 Drawing Figures

PATENTED AUG 7 1973
3,750,866
SHEET 1 OF 2
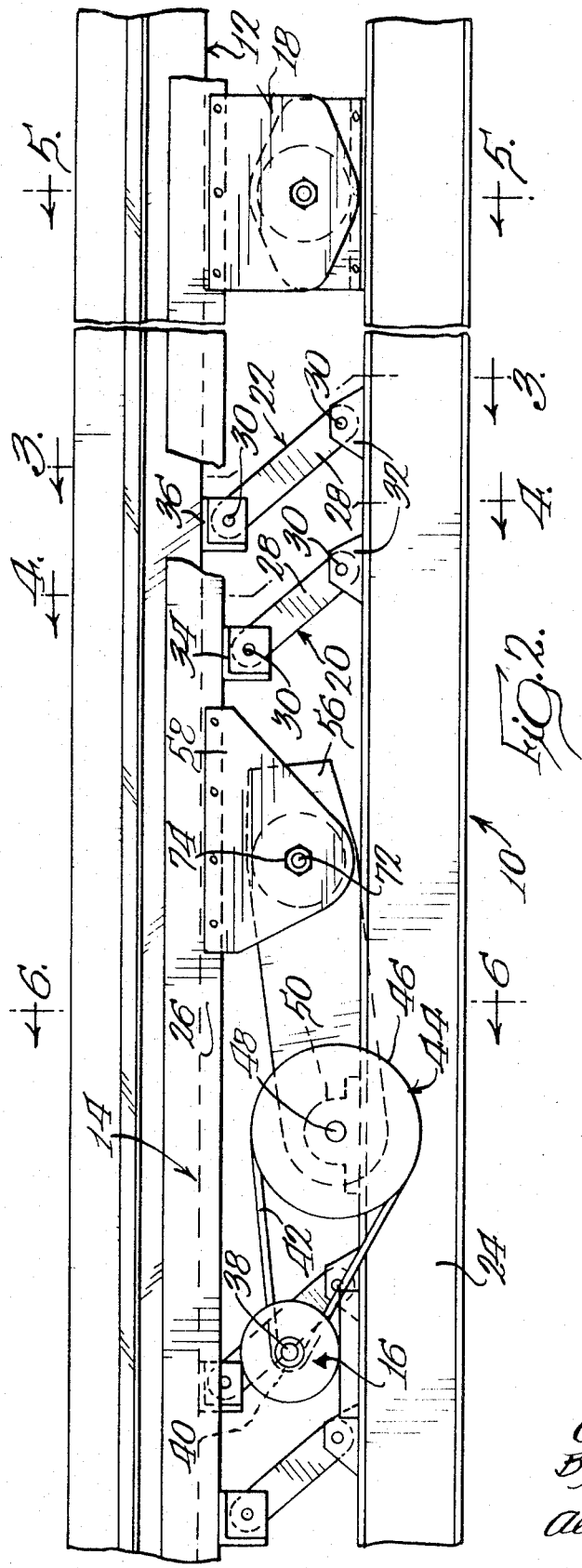
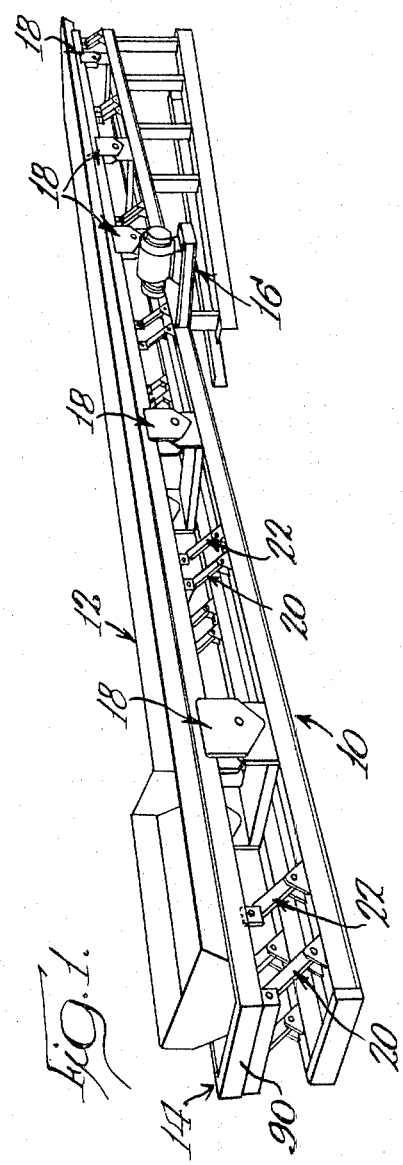
Inventor:
Albert Musschoot
By Hofgren, Wegner
Allen, Stellman & McCord
Att'ys

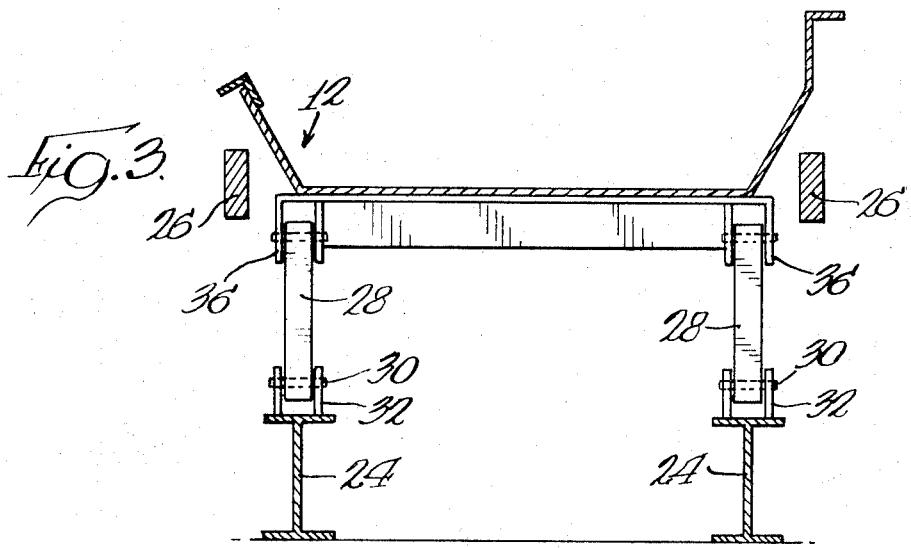
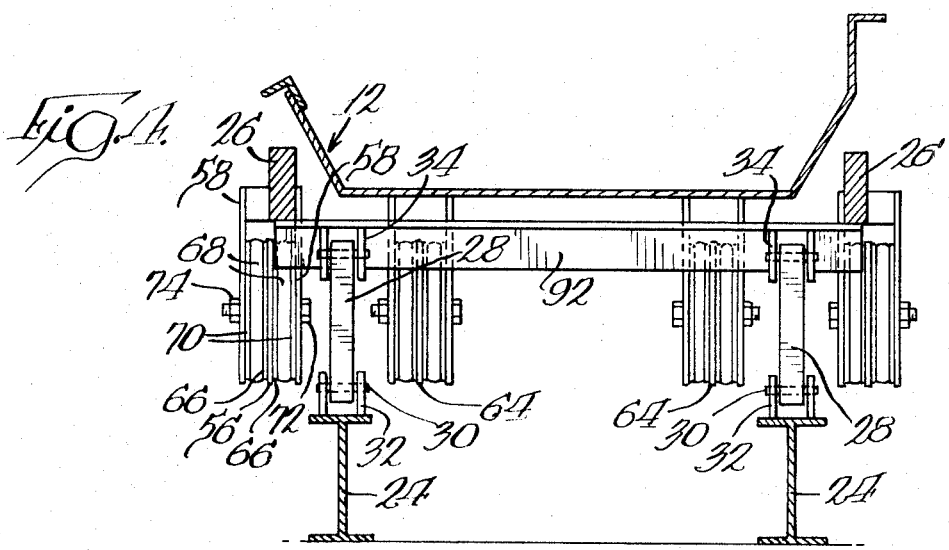
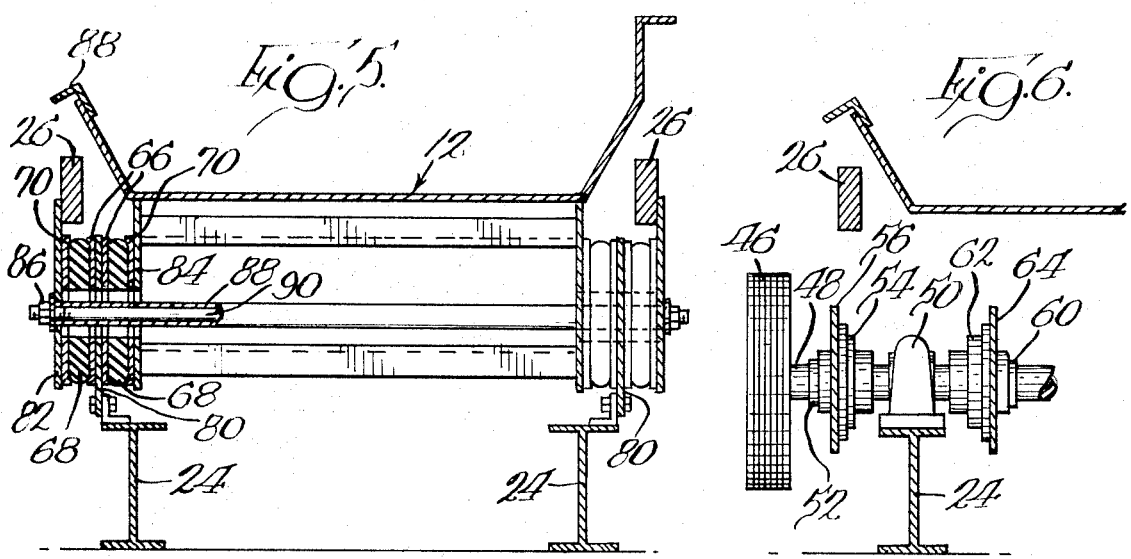

VIBRATORY CONVEYOR WITH COUNTERPOISE

BACKGROUND OF THE INVENTION

In recent years, there has been increasing reliance upon vibratory conveyors for various conveying uses principally because of their low energy requirements and the relatively few moving parts involved. The reliability and maintenance-free operation of such conveyors has resulted in their being adapted for use in extremely heavy conveying operations requiring conveyors having a conveying surface many feet in length and capable of supporting tons of material at any given instance.

In such large scale operations, the mass of the conveyor must, of necessity, be rather large in view of the size of the conveyor and the required support capability and since vibration is the basic principle on which such conveyors operate, extremely large vibratory forces must be dealt with and dissipated.

SUMMARY OF THE INVENTION

It is a principal object of the invention to provide a new and improved vibratory conveyor construction wherein vibratory forces are positively dealt with and dissipated.

More particularly, it is an object of the invention to provide a new and improved large size vibratory conveyor provided with a counterpoise to effectively balance out vibratory forces accompanying operation of a vibratory conveying surface without imparting the same to the base of the conveyor.

The exemplary embodiment of the invention achieves the foregoing objects by means of a construction including a base and an elongated trough-like conveyor. The conveyor is mounted above the base and secured thereto by mounting elements that are pivotally connected to both the conveyor and to the base. In addition, resilient elements are interposed between the conveyor and plates mounted on the base.

An elongated counterpoise formed of a pair of parallel elements having a mass approximately equal to that of the conveyor is similarly mounted on the base with the elements flanking the trough. A rotary drive motor is provided along with a rotary to reciprocating motion converting means operated thereby. The converting means is connected to both the conveyor and to the counterpoise elements for driving the same in synchronism but 180° out of phase with each other.

Resilient elements are also interposed between the counterpoise elements and the plates mounted on the base so that counterbalancing forces are transmitted from the counterpoise via the resilient elements and the plates to the conveyor thereby bypassing the base entirely. As a result, a direct and compact route for transmission of counterbalancing forces bypassing the base is established.

According to one embodiment of the invention, the upper edges of the conveyor overlap the counterpoise elements so that an extremely compact structure results.

Other objects and advantages of the invention will become apparent from the following specification taken in con-junction with the accompanying drawings.

DESCRIPTION OF THE DRAWINGS

FIG. 1 is a perspective view of a vibratory conveyor made according to the invention;

FIG. 2 is a fragmentary side elevation of the conveyor;

FIG. 3 is a vertical section taken approximately along the line 3-3 of FIG. 2;

FIG. 4 is a vertical section taken approximately along the line 4-4 of FIG. 2;

FIG. 5 is a vertical section taken approximately along the line 5-5 of FIG. 2; and FIG. 6 is a fragmentary vertical section taken approximately along the line 6-6 of FIG. 2.

DESCRIPTION OF THE PREFERRED EMBODIMENT

An exemplary embodiment of a balanced vibratory conveyor system made according to the invention is illustrated in FIG. 1 and is seen to comprise an elongated, generally horizontally oriented base 10 having an elongated conveyor, generally designated 12, mounted above the same. The conveyor 12 is generally in the form of a trough having its sides flanked by an elongated counterpoise, generally designated 14.

The base mounts a power source such as a motor having a rotary output shaft, generally designated 16, for reciprocating both the conveyor 12 and the counterpoise 14.

Resilient mounting elements, generally designated 18, are interposed between the base 10 and the conveyor 12 as well as a counterpoise 14, and the general structure is completed by connecting elements, generally designated 20 and 22, respectively, interconnecting the base 10 to the counterpoise 14 and the conveyor 12.

Referring now to FIG. 2, the base 10 is comprised of I-beams 24 while the counterpoise 14 is formed of elongated rails 26. The connecting elements 20 and 22 are in the form of links 28 pivotally connected at their ends by pivot pins 30 to lugs 32 on the upper surface of the base 10 and to depending lugs 34 and 36 on the counteroise rails 26 and the bottom of the conveyor 12, respectively.

The motor 16 has a rotary output shaft 38 mounting a sheave 40 for driving a belt 42 connected to a rotary to reciprocating motion converting means, generally designated 44.

With reference to FIGS. 2 and 6, the rotary to reciprocating motion converting means 44 is seen to include a driven sheave 46 mounted on one end of a shaft 48 journalled in pillow block bearings 50 mounted on the I-beams 24. The construction at both ends of the shaft 48 is the same (with the exception that one end does not include a sheave 46) and accordingly, only one end will be described.

Outboard of the pillow block bearing 50 is an eccentric 52 rotatable with the shaft 48 and which is received in a bearing 54 which, in turn, is fastened to a connecting rod 56. The connecting rod 56 is, in turn, pivotally and resiliently connected, by means to be described in greater detail hereinafter, to a plate 58 fixedly secured to and depending from an associated one of the counterpoise rails 26.

Inboard of the pillow block bearing 50 is a similar structure including an eccentric 60, also rotatable with the shaft 48 and received in a bearing 62 which, in turn, is secured to a connecting rod 64. The connecting rod 64 is, in turn, connected to the conveyor 12 by means to be described hereinafter.

As a result of the foregoing construction, when the sheave 46 is driven by the motor 16, the resulting rotation of the shaft 48 will drive the eccentrics 52 and 60 so that the associated connecting rods 56 and 64 will be reciprocated. For reasons to become more apparent hereinafter, the eccentrics 52 and 60 are arranged with respect to each other so that their associated connecting rods 56 and 64 will be driven 180° out of phase with each other.

With reference now to FIG. 4, the manner of connection of the connecting rods 56 and 64 to the counterpoise rails 26 and the conveyor 12 will be described in greater detail. In particular, connecting rods 56 have their ends remote from the shaft 48 sandwiched between two plates 66 which, in turn, are sandwiched between a pair of donut-shaped configurations 68 formed of rubber or the like. The donuts 68 are, in turn, sandwiched between a pair of plates 70 and finally by a pair of the plates 58, which, it will be recalled, are secured to the counterpoise rails 26. A bolt 72 together with a nut 74 holds the entire assemblage together. The connecting rods 64 are similarly connected to the underside of the conveyor 12.

With reference specifically to FIG. 5, the resilient connections 18 between the conveyor 12 and the counterpoise rails 26 are seen to be generally similar to that described previously with regard to the connecting rods 56. That is, rubber donuts 68 flank plates 66 which, in turn, sandwich a plate 80 secured to a respective one of the I-beams 24. Plates 70 are also employed to flank the donuts while a plate 82 outboard of the assemblage is secured, by any suitable means, to a corresponding one of the counterpoise rails 26. An inboard plate 84 is, in turn, secured to the underside of the conveyor 12.

As seen in FIG. 5, the donuts 68 have a center opening 86 that is considerably larger than a securing element 88 which telescopingly receives a threaded rod 94 holding the entire assemblage together. In addition, the plates 66, 70 and 84 have similar enlarged openings so that a lost motion, but resilient connection is established. This interrelation of elements is true of the component's parts illustrated in FIG. 4 as well.

It is worthy of note in the various figures that the upper edges 88 of the conveyor 12 overlap the counterpoise rails 26 to result in a structure that takes no more space than the conveyor 88 itself. Finally, various elements such as an end piece 90 illustrated in FIG. 1 or rails 92 illustrated in FIG. 4 may interconnect the counterpoise rails 26 at various points along the length thereof to insure a sturdy construction.

In operation, the material to be moved may be fed to one end of the conveyor 12, and with the motor 16 energized, reciprocating motion will be imparted to both the counterpoise 14 and the conveyor 12. By virtue of the previously described arrangement of the eccentrics 52 and 60 with respect to each other, as the conveyor 12 moves to the left, the counterpoise 14 will move to the right and vice versa. Preferably, the counterpoise 14 has approximately the same mass as the conveyor 12 and since both masses are substantially equal and will be moving in opposite directions at all times, the attendant vibratory forces balance out. Because of the unique construction involving the flanking of mounting plates 80 on the base by the resilient elements in the form of donuts 68 associated with both the counterpoise and the conveyor, the oppositely directed forces from the conveyor and the counterpoise are transmitted directly between the two moving elements and bypass the base entirely. As a result, there is no tendency for the base 10 to "walk" or transmit vibration to structural parts of a building in which the conveyor may be used. This is in direct contrast to prior art structures wherein counterbalancing forces were transmitted by springs to a base and were forced to follow a path from the counterbalance to the springs, from the springs to the base, from the base to the conveyor supporting springs and from the latter springs to the conveyor. As a result, extremely large conveyors may be made embodying the principles herein disclosed without concern for vibration problems and in very compact form.

I claim:

1. A balanced vibratory conveyor comprising: means defining a base; means defining an elongated conveyor having a conveying surface; means mounting said conveyor for reciprocal movement on said base; means for reciprocating said conveyor on said base; means defining a counterpoise having a mass approximately equal to that of said conveyor; means mounting said counterpoise for reciprocation relative to said base; and means for reciprocating said counterpoise oppositely of the reciprocation of said conveyor and in substantial synchronism therewith; at least one resilient connection between said conveyor and said counterpoise; and means securing said connection to said base.

2. The vibratory conveyor of claim 1 wherein said conveying surface is in the form of an upwardly opening trough and said counterpoise comprises two elongated, generally parallel elements flanking said trough.

3. A balanced vibratory conveyor comprising: an elongated, generally horizontally oriented base; an elongated trough-like conveyor above and spaced from said base; a plurality of mounting elements extending between said base and said conveyor and being pivotally connected to both said base and said conveyor; a pair of generally parallel counterpoise elements, said counterpoise elements being elongated and flanking the sides of said conveyor; a plurality of mounting elements extending between said base and said counterpoise elements and being pivotally connected to both said base and said counterpoise elements; a motor having a rotary output shaft mounted on said base; a rotary to reciprocating motion converting means operatively associated with said motor output shaft; means connecting said converting mechanism to both said conveyor and said counterpoise elements so that both said conveyor and said counterpoise elements are reciprocated thereby, said connecting means being such that said conveyor and said counterpoise elements are reciprocated 180° out of phase with each other; means establishing a plurality of direct resilient connections between said conveyor and said counterpoise elements; and means securing each of said connections to said base.

4. The conveyor of claim 3 wherein each of said resilient connections includes a plate secured to said conveyor, a plate secured to an associated counterpoise element, at least one resilient element interposed between said plates, and means securing said plates and said resilient element together in sandwiched relation.

5. The conveyor of claim 3 wherein each of said resilient connections comprises a plate secured to said conveyor, a plate secured to an associated one of said counterpoise elements; two donut-shaped resilient elements interposed between said plates, and means securing the assemblage of said plates and said donuts together; and said securing means comprises an additional plate interposed between said two donuts and connected to said base.

* * * * *